US009288638B2

(12) United States Patent
Ankolekar et al.

(10) Patent No.: US 9,288,638 B2
(45) Date of Patent: Mar. 15, 2016

(54) SOCIAL NETWORKING OF MOBILE DEVICES

(75) Inventors: Anupriya Ankolekar, Sunnyvale, CA (US); Dennis Matthews Wilkinson, Los Altos, CA (US); Bernardo Huberman, Palo Alto, CA (US); Gabor Janos Szabo, Belmont, CA (US); Fang Wu, Palo Alto, CA (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 1075 days.

(21) Appl. No.: 13/148,582

(22) PCT Filed: Feb. 23, 2009

(86) PCT No.: PCT/US2009/034862
§ 371 (c)(1),
(2), (4) Date: Aug. 9, 2011

(87) PCT Pub. No.: WO2010/096063
PCT Pub. Date: Aug. 26, 2010

(65) Prior Publication Data
US 2011/0319058 A1    Dec. 29, 2011

(51) Int. Cl.
*H04W 4/08*    (2009.01)
*H04W 8/18*    (2009.01)
*H04W 8/20*    (2009.01)

(52) U.S. Cl.
CPC .............. *H04W 4/08* (2013.01); *H04W 8/186* (2013.01); *H04W 8/18* (2013.01); *H04W 8/20* (2013.01)

(58) Field of Classification Search
CPC ... G06Q 50/01; G06Q 30/02; G06Q 10/1093; H04L 67/306; H04L 63/104; H04L 67/22; H04L 51/32; G06F 17/3053; H04W 8/18; H04W 4/08; H04W 4/206; H04W 8/20; H04M 3/2218
See application file for complete search history.

(56) References Cited

U.S. PATENT DOCUMENTS

| | | | | |
|---|---|---|---|---|
| 7,088,805 | B1 * | 8/2006 | Moore | H04M 15/00 379/121.05 |
| 7,167,910 | B2 | 1/2007 | Farnham et al. | |
| 7,318,037 | B2 | 1/2008 | Solari | |
| 7,716,140 | B1 * | 5/2010 | Nielsen et al. | 705/319 |
| 7,949,611 | B1 * | 5/2011 | Nielsen et al. | 705/319 |
| 8,630,398 | B2 * | 1/2014 | Gundotra | G06Q 10/00 379/114.03 |
| 8,913,723 | B2 * | 12/2014 | Gundotra | G06Q 10/00 379/114.03 |
| 2005/0171799 | A1 | 8/2005 | Hull et al. | |

(Continued)

OTHER PUBLICATIONS

International Search Report and Written Opinion for PCT Application No. PCT/US2009/034862; Received Oct. 6, 2009; pp. 13.

(Continued)

*Primary Examiner* — Matthew Sams
(74) *Attorney, Agent, or Firm* — Mannava & Kang, P.C.

(57) ABSTRACT

A method for social networking of mobile devices based upon telephone numbers of the mobile devices includes receiving user profile information and telephone numbers of contacts from a plurality of users' mobile devices; at least one of creating and updating respective user profiles based upon the telephone numbers of the users' mobile devices and the received profile information; identifying relationships among the users based at least upon the contacts contained in the contacts information; and establishing a social network group including at least two of the users based upon the identified relationships among the users.

16 Claims, 5 Drawing Sheets

(56) References Cited

U.S. PATENT DOCUMENTS

| | | |
|---|---|---|
| 2005/0177385 A1* | 8/2005 | Hull et al. ............... 705/1 |
| 2005/0197846 A1* | 9/2005 | Pezaris et al. ............ 705/1 |
| 2006/0042483 A1* | 3/2006 | Work et al. ............... 101/91 |
| 2007/0202870 A1* | 8/2007 | Bian et al. ............... 455/428 |
| 2007/0266003 A1* | 11/2007 | Wong et al. ............... 707/3 |
| 2008/0040475 A1* | 2/2008 | Bosworth et al. ............ 709/224 |
| 2008/0056269 A1 | 3/2008 | Madhani et al. |
| 2008/0114543 A1* | 5/2008 | Vishnu ............... 701/209 |
| 2008/0256170 A1 | 10/2008 | Hayashi et al. |
| 2009/0005040 A1 | 1/2009 | Bourne |
| 2009/0013413 A1* | 1/2009 | Vera et al. ............... 726/30 |
| 2009/0070852 A1* | 3/2009 | Chijiiwa et al. ............ 726/1 |
| 2009/0117883 A1* | 5/2009 | Coffing et al. ............ 455/414.1 |
| 2009/0235335 A1* | 9/2009 | Mendiola ............... 726/4 |
| 2010/0144323 A1* | 6/2010 | Collins et al. ............ 455/414.1 |
| 2010/0169364 A1* | 7/2010 | Hardt ............... 707/769 |
| 2010/0306185 A1* | 12/2010 | Smith ............... G06Q 10/107 707/709 |
| 2010/0312714 A1* | 12/2010 | Ourega ............... 705/319 |
| 2011/0319058 A1* | 12/2011 | Ankolekar et al. ........ 455/414.1 |
| 2012/0163574 A1* | 6/2012 | Gundotra ............... G06Q 10/00 379/114.03 |
| 2014/0126709 A1* | 5/2014 | Gundotra ............... G06Q 10/00 379/201.05 |

OTHER PUBLICATIONS

Kelly, Gordon; "First Look: 3's Brilliant INQ1 Social Networking Phone", www.trustedreviews.com, Nov. 13, 2008.

* cited by examiner

SOCIAL NETWORKING OF MOBILE DEVICES

BACKGROUND

Web-based social networking applications, such as, Facebook™, MySpace™, and LinkedIn™, have been enjoying growing popularity ever since their inception. These applications are typically operated as managed services by application service providers and share several common characteristics. For instance, users typically create unique personal profiles using their email addresses or other login information that include basic information about the users. Users typically map their relationship with other members by either inviting other members join their network or by using software to scan existing relationships. Typically, connections between the users are facilitated by sending messages, such as emails, to other users. Users of conventional, Web-based social networking applications are typically avid Internet users or specific groups of professionals because keeping the information and connections current requires considerable effort on the part of the user and thus appeals mainly to dedicated users with sufficient technical experience.

Mobile social networking applications, such as Dodgeball™ and MobiVibe™, are applications for providing such functions as, friend-finding, text-dating and community message aggregation. Conventional mobile social networking applications do not provide the same type of social networking capabilities as the Web-based social networking applications, and are thus relatively limited in their capabilities.

BRIEF DESCRIPTION OF DRAWINGS

The embodiments of the invention will be described in detail in the following description with reference to the following figures.

DETAILED DESCRIPTION OF EMBODIMENTS

For simplicity and illustrative purposes, the principles of the embodiments are described by referring mainly to examples thereof. In the following description, numerous specific details are set forth in order to provide a thorough understanding of the embodiments. It will be apparent however, to one of ordinary skill in the art, that the embodiments may be practiced without limitation to these specific details. In some instances, well known methods and structures have not been described in detail so as not to unnecessarily obscure the embodiments.

Disclosed herein is a method for social networking of mobile devices based upon telephone numbers of the mobile devices. Also disclosed herein are a method of operating a mobile device for social networking and a mobile device for performing the method. The methods disclosed herein enable lightweight social networking for mobile device users that do not require the use of separate Web-based social networking services. Instead, the methods disclosed herein employ the voice call and messaging activity of the user to establish and update the social network.

In one regard, the user's address book, and voice call and messaging history of the user provide information may be used to automatically define the user's place in a social space. This information may automatically be analyzed to automatically set up and update the social network. Thus, through implementation of the methods and apparatuses disclosed herein, the social network may continually be updated by the users simply making voice calls, sending text messages, and updating contacts lists. In other words, the users are not required to expend additional effort or have additional technical experience for the social network to be established and updated. As such, mobile device usage is seamlessly connected to and enables the social network.

Figure 1:
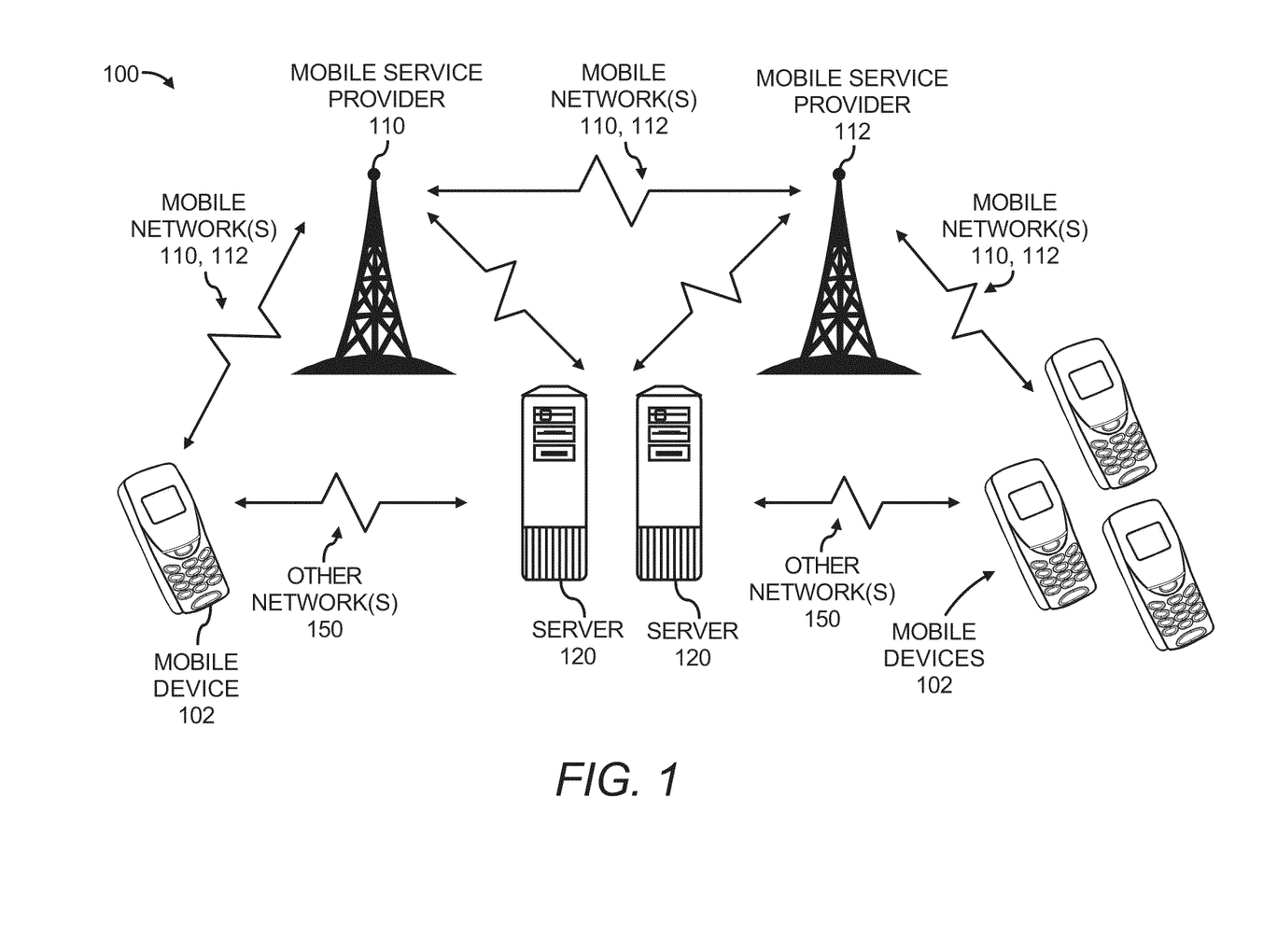
FIG. 1 illustrates a schematic diagram of a communications environment in which a social network may be established among a plurality of mobile devices, according to an embodiment of the invention.

With reference first to FIG. 1, there is shown a schematic diagram of a communications environment 100 in which a social network may be established among a plurality of mobile devices, according to an example. It should be understood that the communications environment 100 may include additional elements and that some of the elements described herein may be removed and/or modified without departing from a scope of the communications environment 100.

The communications environment 100 includes a plurality of mobile devices 102, each of which comprises a mobile telephone or other device through which users are able to place or receive voice calls. In addition, the mobile devices 102 may comprise wireless access protocol (WAP)-enabled devices that are configured to send and receive data over one or more mobile networks 110, 112 using the WAP, such as, through CDMA, GSM, CDPD, PDC, PHS, TDMA, FLEX, ReFLEX, etc. The mobile devices 102 may also comprise devices that are able to communicate text messages, such as, through SMS (short message service), enhanced SMS (EMS), multi-media messages (MMS), etc. The mobile devices 102 may operate on the same or different types of wireless mobile networks 110, 112.

The mobile devices 102 are configured to access one or more networks through a wireless connection over the mobile network(s) 110, 112 with one or more mobile service providers 110, 112. Thus, for instance, a user may use one of the mobile devices 102 to connect to another user of another one of the mobile devices 102, in which the connection is facilitated through one or more of the mobile service providers 110, 112. Although particular reference is made throughout the present disclosure of voice calls being made over the mobile network(s) 110, 112, the mobile devices 102 may also or alternatively be configured to make voice calls of other networks 150, such as, the Internet. An example of this type of voice call is a voice over internet protocol (VOIP) call.

The mobile devices 102 are also configured to communicate information to one or more servers 120, which are configured to establish a social network among a plurality of the mobile devices 102 using the information received from the mobile devices 102. In one embodiment, the mobile devices 102 are configured to communicate the information to the server(s) 120 through the same mobile service provider(s) 110, 112 used for communication of voice and other data with other mobile devices 102. In another embodiment, the mobile devices 102 are configured to connect to the server(s) 120 through other types of networks 150, such as, a 3G network, a GPRS network, a GSM network, etc., or through Wi-Fi, WLAN networks, or otherwise through an Internet connection.

As described in greater detail herein below, the server(s) 120 is configured to identify the mobile devices 102 based upon their respective telephone numbers and to group the mobile devices 102 together based upon, for instance, the relationships between the users of the mobile devices 102, to thereby establish a social network among the users of the mobile devices 102. In one example, the server(s) 120 may control the communication of various information between the mobile devices 102 based upon the groupings of the mobile devices 102.

Figure 2:
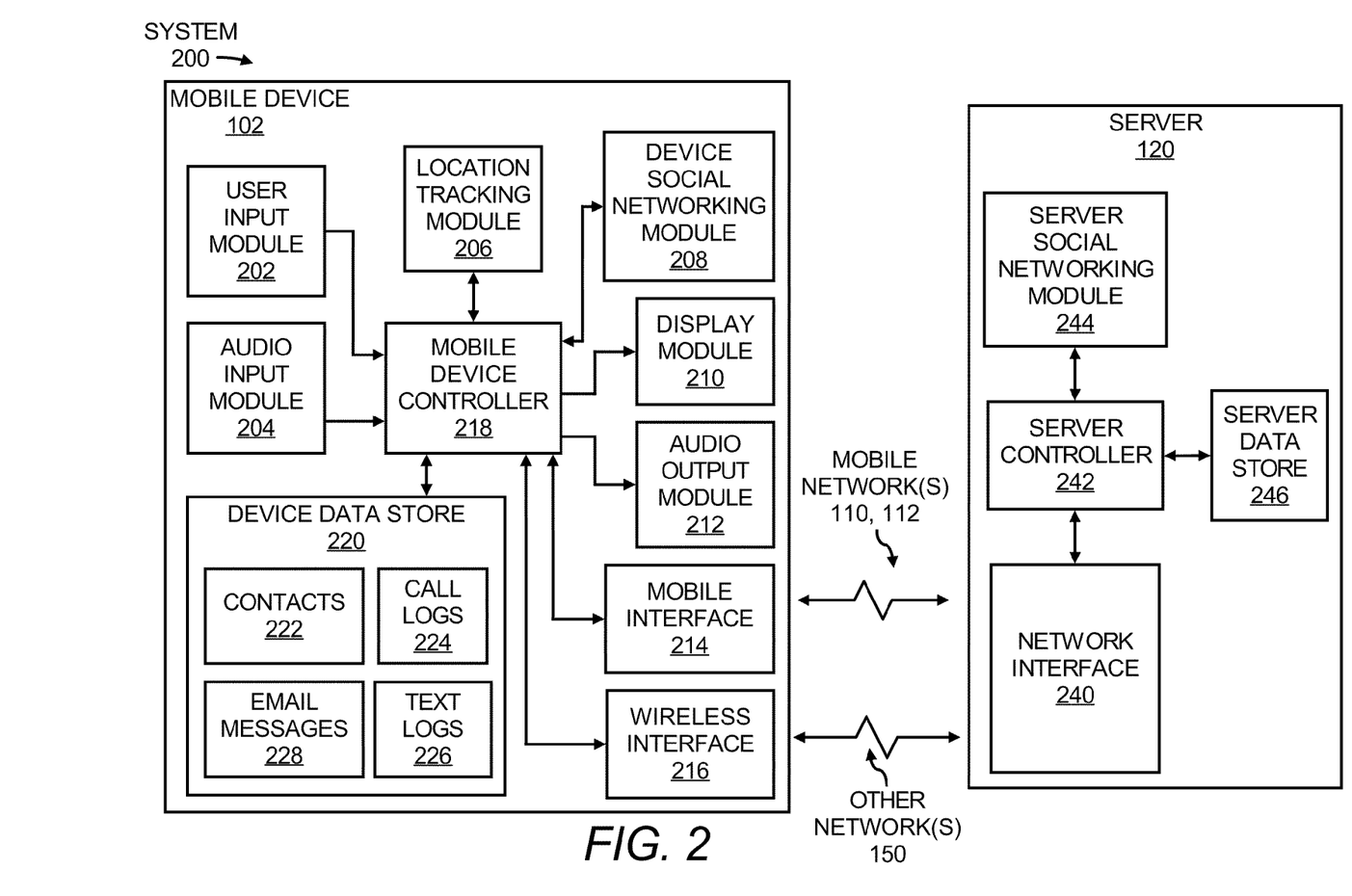
FIG. 2 illustrates a system for social networking among users of mobile devices, according to an embodiment of the invention.

Turning now to FIG. 2, there is shown a system 200 for social networking among users of mobile devices 102, according to an example. It should be understood that the system 200 may include additional elements and that some of the elements described herein may be removed and/or modified without departing from a scope of the system 200. For instance, the system 200 may include any number of mobile devices 102 and any number of servers 120.

As shown, the mobile device 102 includes a user input module 202, an audio input module 204, a location tracking module 206, a device social networking module 208, a display module 210, an audio output module 212, a, a wireless interface 216, a mobile device controller 218, and a device data store 220. Although not shown, the mobile device 102 may also include a microphone for receiving audio, a speaker for outputting audio, keys or a touchscreen for receiving inputs from a user, a display for displaying visual information, etc. In addition, the other mobile devices 102 depicted in FIG. 1 may be similarly configured to the mobile device 102 depicted in FIG. 2.

The modules 202-212 may comprise software, firmware, and/or hardware. Thus, for instance, one or more of the modules 202-212 may comprise software modules stored on one or more computer readable media, such as, in the device data store 220. Alternatively, one or more of the modules 202-212 may comprise one or more hardware modules, such as circuits, or other devices configured to perform various functions as described above below.

The mobile interface 214 and the wireless interface 216 may comprise software, hardware, or a combination thereof to enable data in various forms to be communicated to and from the mobile device 102. For instance, the mobile interface 214 enables voice and/or text data to be communicated over the mobile networks 110, 112 and the wireless interfaces 216 enables data, such as, web-based data, to be communicated over one or more other networks The mobile device controller 218 may comprise a microprocessor, ASIC, or the like, configured to perform various computing operations in the mobile device 102. In one example, the mobile device controller 218 comprises a chip or circuit employed in conventional mobile devices, such as, cellular telephones, PDA's, etc. In another example, the mobile device controller 218 comprises a chip or circuit specially configured to perform the various operations discussed herein. In a further example, the mobile device controller 218 comprises a software program stored on a computer-readable storage medium and is configured to be implemented by a processor of the mobile device 102. The term "implement" may be considered as including an invoking or other operation throughout the present disclosure.

In any event, the mobile device controller 218 is configured to implement the user input module 202 to receive inputs from a user. In this regard, the user input module 202 is connected to one or more input devices, such as, a numeric or alphanumeric keypad, a touchscreen display, a pointing device, etc. The inputs may include, for instance, input of telephone numbers, text messages, contact information, user profile preference information, etc.

The mobile device controller 218 is configured to implement the audio input module 204 to receive audio inputs from a user. In this regard, the audio input module 204 is connected to one or more audio input devices, such as, an integrated microphone, a wired microphone, a wirelessly connected microphone (for instance, a Bluetooth-enabled device), etc. The audio input module 204 may thus receive audio commands, such as, voice activated dialing, etc., as well as voice input from a user during a telephone call through the mobile device 102.

The mobile device controller 218 is configured to implement the location tracking module 206 to receive positioning information of the mobile device 102. In one example, the location tracking module 206 is connected to a global positioning system (GPS) enabled device configured to automatically track its location through use of, for instance, satellite or tower-based global positioning systems. In another example, the location tracking module 206 is connected to another type of device that is configured to determine the device's location within, for instance, a city-level or better accuracy.

The mobile device controller 218 is configured to implement the device social networking module 208 to perform various functions with respect to establishing and updating of a social network in which the mobile device 102 is grouped. In one example, the device social networking module 208 is configured to order the contacts 222 based on a relative strength of the relationship the user has with the contacts 222 and to cause the contacts 222 to be displayed based upon the relative relationship strengths. Thus, for instance, those contacts 222 that the user calls or texts the most frequently may be at the highest level in the order of contacts. In addition, a user may explicitly define the one or more characteristics, such as, the time, the duration, the location, etc., of interactions, based upon which the contacts 222 are arranged. Various other functions that the device social networking module 208 performs are described in greater detail herein below.

According to an example, the device social networking module 208 comprises a software application that is pre-installed on the mobile device 102. According to another example, the device social networking module 208 comprises a software application that is installed as an add-on software to the mobile device 102.

The mobile device controller 218 is configured to implement the display module 210 to output visual information to a user. In this regard, the display module 210 is connected to one or more displays, such as, an integrated display, a remotely connected display, etc. The visual information displayed may include, for instance, visual feedback of inputs provided by the user, contacts lists of the user grouped according to various factors, visual display of user preferences, visual display of images or video, information pertaining to the data received from the server(s) 120, etc.

The mobile device controller 218 is configured to implement the audio output module 212 to output audio to a user. In this regard, the audio output module 212 is connected to one or more audio output devices, such as, an integrated speaker, a wired speaker, a wirelessly connected speaker (for instance, a Bluetooth™-enabled speaker device), etc. The audio output module 212 may thus output conversations from a caller to the mobile device 102, music stored in the device data store 220, etc.

The mobile device controller 218 may access information stored in the device data store 220 in implementing one or more of the modules 202-212. Although the device data store 220 may store additional types of information, the device data store 220 is depicted as storing information pertaining to contacts 222, call logs 224, text messaging logs 226 (such as, SMS, EMS, MMS, etc.), and email messages 228 for purposes of illustration. The device social networking module 208 may track the call logs 224, such as, telephone number dialed, call duration, and time of call, the text messaging logs 226, and changes to the contacts 222 and may communicate the tracked data to the server 120, as discussed in greater detail herein below. The device data store 220 may comprise volatile and/or non-volatile memory, such as DRAM, EEPROM, MRAM, flash memory, and the like. In addition, or alternatively, the device data store 220 may comprise a device configured to read from and write to a removable media, such as, a floppy disk, a CD-ROM, a DVD-ROM, or other optical or magnetic media.

As further shown in FIG. 2, the server 120 is depicted as including a network interface 240, a server controller 242, a server 242, a server social networking module 244, and a server data store 246. The server social networking module 244 may comprise software, firmware, and/or hardware. Thus, for instance, the server social networking module 244 may comprise a software module stored on a computer readable medium, such as, in the server data store 246. Alternatively, the server social networking module 244 may comprise a hardware module, such as a circuit, or other device configured to perform various functions as described below.

The network interface 240 may comprise software, hardware, or a combination thereof, to enable data in various forms to be communicated to and from the server 120. For instance, the network interface 240 enables data to be communicated to and from the server 120 over one or more of the mobile networks 110, 112 and/or over one or more of the other networks 150, such as, the Internet. In one example, therefore, the server 120 may receive data containing the tracked call logs 224 as well as other information from a user's mobile device 102, through a connection to the mobile device 102 over a mobile network 110 and/or through an Internet connection.

The server controller 242 may comprise a microprocessor, ASIC, or the like, configured to perform various computing operations in the server 120. In one example, the server controller 242 comprises a chip or circuit employed in conventional servers. In another example, the server controller 242 comprises a chip or circuit specially configured to perform the various operations discussed herein. In a further example, the server controller 242 comprises a software program stored on a computer-readable storage medium and is configured to be implemented by a processor of the server 120.

In any event, the server controller 242 is configured to implement the server social networking module 244 to perform various functions with respect to establishing and updating of one or more social networks composed of a plurality of mobile devices 102. The various functions performed by the server social networking module 244 are described in greater detail herein below.

According to an example, the server social networking module 244 may track the contacts of the various users in a particular group and may communicate this information to other users in the group. In addition, the server social networking module 244 may identify strengths of the relationships between users and may communicate this information to the users in the group. In one regard, the server social networking module 244 may identify strengths of relationships between the users based upon the identified interaction characteristics, such as, the time, the duration, the location, etc., of interactions. Thus, by way of example, the device social networking module 208 may display the information pertaining to the contacts and the relationship strengths to a user of a mobile device 102 to enable the user to see the relative "closeness" of the other users to each other in the group or to other users outside of the group.

The server controller 242 may store information received from the mobile devices 102 and may also store various other information pertaining to implementation of the server social networking module 244 in the server data store 246. The server data store 246 may comprise volatile and/or non-volatile memory, such as DRAM, EEPROM, MRAM, flash memory, and the like. In addition, or alternatively, the server data store 246 may comprise a device configured to read from and write to a removable media, such as, a floppy disk, a CD-ROM, a DVD-ROM, or other optical or magnetic media.

An example of a method of operating a mobile device 102 for establishing and operating a social network including the mobile device 102 will now be described with respect to the following flow diagram of the method 300 depicted in FIG. 3. It should be apparent to those of ordinary skill in the art that the method 300 represents a generalized illustration and that other steps may be added or existing steps may be removed, modified or rearranged without departing from a scope of the method 300.

The description of the method 300 is made with reference to the mobile device 102 illustrated in FIG. 2, and thus makes reference to the elements cited therein. It should, however, be understood that the method 300 is not limited to the elements set forth in the mobile device 102. Instead, it should be understood that the method 300 may be practiced by a system having a different configuration than that set forth in the mobile device 102.

At step 302, the user input module 202 receives user profile information and preferences from a user of the mobile device 102. The profile information may include, for instance, the information that the user would like to display to other users, such as, the user's name and other biographical information, such as, a personal photograph, birth date, educational background, marital status, employment information, etc. The user profile information may also include requests from the user to connect to or "invite" other users to join in a particular social network.

The preferences may include, for instance, the types of information that the server 120 provides to various users depending upon whether the users are in the same social network as the user of the mobile device 102. The preferences may also include instructions on the types of information that the server 120 provides to users depending upon whether the users are in particular groups, such as, friends, family, colleagues, etc. By way of example, the user may indicate preferences for a private profile, which is displayed to other users grouped with the user, and a public profile, which is displayed to other users outside of the user's groups.

According to an example, the device social networking module 208 may cause a listing of questions pertaining to the user profile and preferences to be displayed on a screen of the mobile device 102. In this example, the device social networking module 208 may have a standardized manner of receiving the user profile information and preferences. According to another example, the user may input the information pertaining to the user profile and preferences through use of a Web-based application.

At step 304, the device social networking module 208 identifies the user profile information and/or the user preferences. The device social networking module 208 may identify the user profile information and/or the user preferences from inputs to the standardized information screen. The device social networking module 208 may also identify one or more telephone numbers of users that the user of the mobile device 102 wishes to "invite" to join in a particular group of the social network.

At step 306, the device social networking module 208 accesses the contacts 222 stored in the device data store 220. According to an example, the device social networking module 208 accesses the contacts 222 to identify the telephone numbers of the contacts 222 stored in the device data store 220. In another example, the device social networking module 208 orders the contacts 222 based on a relative strength of the relationship that the user has to each of the contacts 222. Thus, for instance, those contacts 222 that the user calls and/or texts the most frequently may be at the highest level in the order of contacts.

At step 308, the device social networking module 208 accesses the call logs 224 and/or the text message logs 226 stored in the device data store 220. In addition, or alternatively, the device social networking module 208 tracks the voice calls and/or the text messages communicated to and from the mobile device 102 at step 308.

At step 310, the device social networking module 210 may obtain location data identified by the location tracking module 206. Step 310 may be optional because the server 102 does not require the location data of the mobile device 102 to establish or update the social network. Instead, the server 102 may employ the location data to enable users to identify the locations of other users to which they are grouped in instances where the users authorize transfer of such information.

At step 312, the device social networking module 208 communicates the user profile information/preferences, the telephone numbers of the contacts 222, the accessed/tracked voice calls and/or text messages, and, in certain instances, the location data, to a server 120. As discussed above, the mobile device 102 may communicate the information to the server 120 through one or more mobile networks 110, 112 or through other networks 150, such as, the Internet. In addition, as discussed in greater detail herein below with respect to FIG. 4, the server 120, and more particularly, the server social networking module 244, implements the information received from the device social networking module 208 in establishing and updating a social network including the mobile device 102 and at least one other mobile device 102.

At step 314, the device social networking module 208 receives data from the server 120 and causes some or all of the data to be displayed to a user. The data may include, for instance, information pertaining to one or more other users that are grouped in the social network with the user of the mobile device 102, as described in greater detail herein below.

The device social networking module 208 may repeat steps 302-314 in a periodic or continuous manner or as changes to the user profile information and user preferences are received to update the information and the user preferences stored in the server 120 and to continuously receive data from the server 120.

An example of a method of operating a server 120 for establishing and operating a social network including the mobile device 102 will now be described with respect to the following flow diagram of the method 400 depicted in FIG. 4. It should be apparent to those of ordinary skill in the art that the method 400 represents a generalized illustration and that other steps may be added or existing steps may be removed, modified or rearranged without departing from a scope of the method 400.

The description of the method 400 is made with reference to the server 120 illustrated in FIG. 2, and thus makes reference to the elements cited therein. It should, however, be understood that the method 400 is not limited to the elements set forth in the server 120. Instead, it should be understood that the method 400 may be practiced by a system having a different configuration than that set forth in the server 120.

At step 402, the server 120 receives data pertaining to the information communicated by one or more of the mobile devices 102. As discussed above, the network interface 240 of the server 120 may be configured to receive the data through one or more mobile networks 110, 112 and/or through one or more other networks, such as, the Internet. In addition, the server 120 may receive data pertaining to the user profile information, the preferences, the contacts, and/or the voice call and text message information, the locations, of the one or more users of the mobile devices 102.

At step 404, the server social networking module 244 determines whether the data received at step 402 is from a new user. The server social networking module 244 may determine that the data is received from a new user if the server social networking module 244 does not have an existing user profile for the user.

In response to a determination that the data is received from a new user, at step 406, the server social networking module 244 creates a user profile for the new user. The user profile generally comprises data pertaining to the individual user, such as, the telephone numbers and other information of the contacts 222 stored in the respective mobile devices 102, the characteristics of interactions between the user and other users, the relative strengths of the contacts 222 stored in the respective mobile devices 102, various categories into which the contacts 222 are classified by the user, the preferences of the users, etc.

At step 408, the server social networking module 244 identifies relationships among the users based at least upon the contacts contained in the contacts information. The server social networking module 244 may identify the relationships among the users from the information received from the users at step 402. By way of example, the server social networking module 244 may receive identification of the users contained in the contacts 222 that a user wishes to include in a particular group of the social network. As another example, the server social networking module 244 may determine strengths of relationships between the user and the contacts 222 based upon the information contained in at least one of the user's call logs and the text logs. Thus, for instance, the server social networking module 244 may determine that the user has a stronger relationship with those contacts 222 that the user calls/texts most often, with those contacts 222 that the user has the longest conversations/text strings, with those contacts 222 that the user calls at particular times during the day, etc.

The server social networking module 244 may list the users based upon a ranking of the relationships that the users have with the particular user. For instance, the server social networking module 244 may arrange the contacts 222 in a ranked order list according to the categories into which the contacts 222 have been classified by the user. As another example, the server social networking module 244 may list the users based upon a ranking of the determined relationship strengths.

The server social networking module 244 may further automatically classify the contacts 222 into particular categories based upon, for instance, geographical locations of the contacts 222, the times at which the user calls the contacts 222, etc. By way of example, the server social networking module 244 may classify those contacts 222 that are within a predetermined vicinity, such as, in the same building, during the middle of the day, etc., as comprising business or school contacts and those contacts 222 that are within a predetermined vicinity at night or early morning as friends or family contacts. In addition, the server social networking module 244 may enable the user to track the locations of various contacts 222 and may alert the user when a particular contact 222 is within a predetermined proximity to the user.

At step 410, the server social networking module 244 establishes a social network group that includes the user and at least one other user based upon the identified relationships of the users. Thus, for instance, the server social networking module 244 may receive a request from the user to connect the at least one other user with the user in a group. The server social networking module 244 may communicate the request for the at least one other user to join in the group and may establish the social network group once an acceptance from the at least one other user is received.

According to an example, establishment of the social network group connects the users in the group together. In other words, the server social networking module 244 is configured to store data indicating that the users in a group are correlated with respect to each other. The server social networking module 244 may employ the correlations in tracking various features of the user relationships, such as, which of the users have common contacts, which telephone numbers the users dial the most frequently, etc.

At step 412, the server social networking module 244 communicates information to one or more of the mobile devices 102. The information communicated may depend upon whether the users belong to a particular group, a particular category in a group, etc. The server social networking module 244 thus generally enables the users of the social network group to view information pertaining to other users of the social network group.

For instance, the users may view profile information, such as, the user's name and other biographical information, such as, birth date, educational background, marital status, employment information, etc. The information may further include identification of the contacts stored in the users' mobile devices 102, for instance, arranged into various categories. The information may also include the identities of users in other groups to which the users belong. The information may further include location information, such as, current locations identified by respective location tracking devices, of the users. The information may further include current status information of the users' mobile devices 102, such as, whether the users are currently available to receive voice calls, whether the mobile devices 102 are set to a silent mode, etc.

As discussed above, the users may define the information that is provided to other users in the group as well as to users outside of the group be setting various preferences. In addition, the users may further define the information that is provided to users in a group based upon their categorizations. Thus, for instance, users categorized as "friends" may receive different information about a user than users categorized as "colleagues".

The server social networking module 244 may receive additional data at step 402 or, at step 404, the server social networking module 244 may determine that the data has been received from an existing user. In this instance, the server social networking module 244 updates user profiles and preferences at step 414 based upon the data received at step 402.

At step 416, the server social networking module 244 updates relationships among the users based at least upon the contacts contained in the contacts information. Thus, for instance, the contacts information for a particular user may include additional contacts and the server social networking module 244 may update the contacts information for the user to include the additional contacts. In addition, the server social networking module 244 may identify the relationships among the users from the information received from the users at step 402. By way of example, the server social networking module 244 may receive identification of the users contained in the contacts 222 that a user wishes to include in a particular group of the social network. The server social networking module 244 may further revise the list of the users based upon the ranking of the relationships that the users have with a particular user.

In addition, or alternatively, at step 416, the server social networking module 244 may update existing relationships among the users based upon one or more factors. The one or more factors may include receipt of instructions from users to modify the existing relationships that they have with other users. For instance, a user may instruct the server social networking module 244 to change the category into which one or more of the other users have been classified. The one or more factors may also include an automated determination by the server social networking module 244 of changes to existing relationships. For instance, the server social networking module 244 may determine the strengths of relationships between the users based upon the call log information and the text log information.

At step 418, the server social networking module 244 updates the social network group based upon the updated relationships of the users. Thus, for instance, the server social networking module 244 may receive a request from the user to connect the at least one other user with the user in a group and may update the group to include the at least one other user once an acceptance from the at least one other user is received.

The server social networking module 244 repeats step 412 to communicate information to the mobile devices 102 based upon the updated social network at step 418. In addition, the server social networking module 244 may continuously repeat steps 402-418 to add new users and to update existing users/groups.

The operations set forth in the methods 300 and 400 may be contained as utilities, programs, or subprograms, in any desired computer accessible medium. In addition, the methods 300 and 400 may be embodied by computer programs, which may exist in a variety of forms both active and inactive. For example, the computer program may exist as software program(s) comprised of program instructions in source code, object code, executable code or other formats. Any of the above may be embodied on a computer readable medium.

Exemplary computer readable storage devices include conventional computer system RAM, ROM, EPROM, EEPROM, and magnetic or optical disks or tapes. Concrete examples of the foregoing include distribution of the programs on a CD ROM or via Internet download. It is therefore to be understood that any electronic device capable of executing the above-described functions may perform those functions enumerated above.

A particular example of a manner in which the mobile device 102 and the server 120 may interact with one another will now be provided to further illustrate the invention. In this example, the user enters a telephone number into the contacts 222 section of the mobile device 102. The user is presented with an option to add the person associated with the telephone number as a member of a social networking group. If the user does not wish to add the person as a member, the person's contact information is added to the contacts 222. If, however, the user does wish to add the person as a member, the server social networking module 224 sends an invitation to the person to join the group. If the person agrees, the server social networking module 224 creates a link between the user and the person and information about the user stored on the server 120 is shared with the person and information about the person stored on the server 120 is shared with the user.

Figure 3:
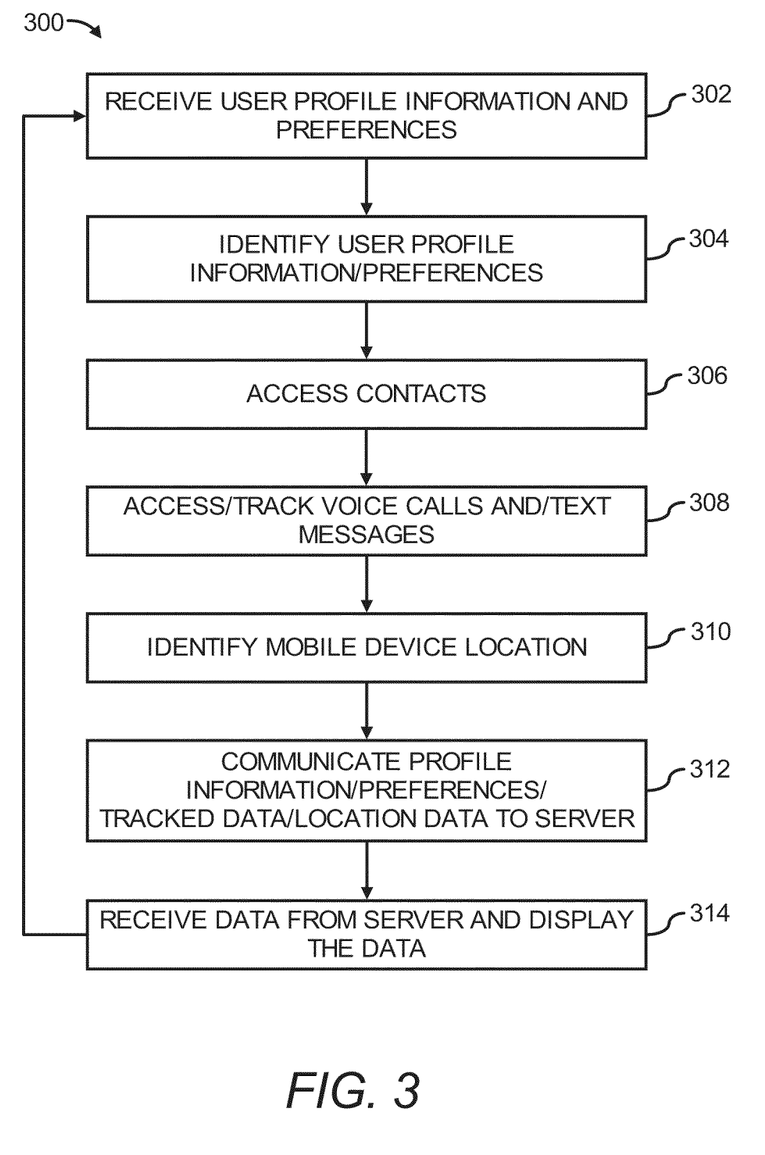
FIG. 3 illustrates a flow diagram of a method for operating a mobile device for establishing and operating a social network including the mobile device, according to an embodiment of the invention.
Figure 4:
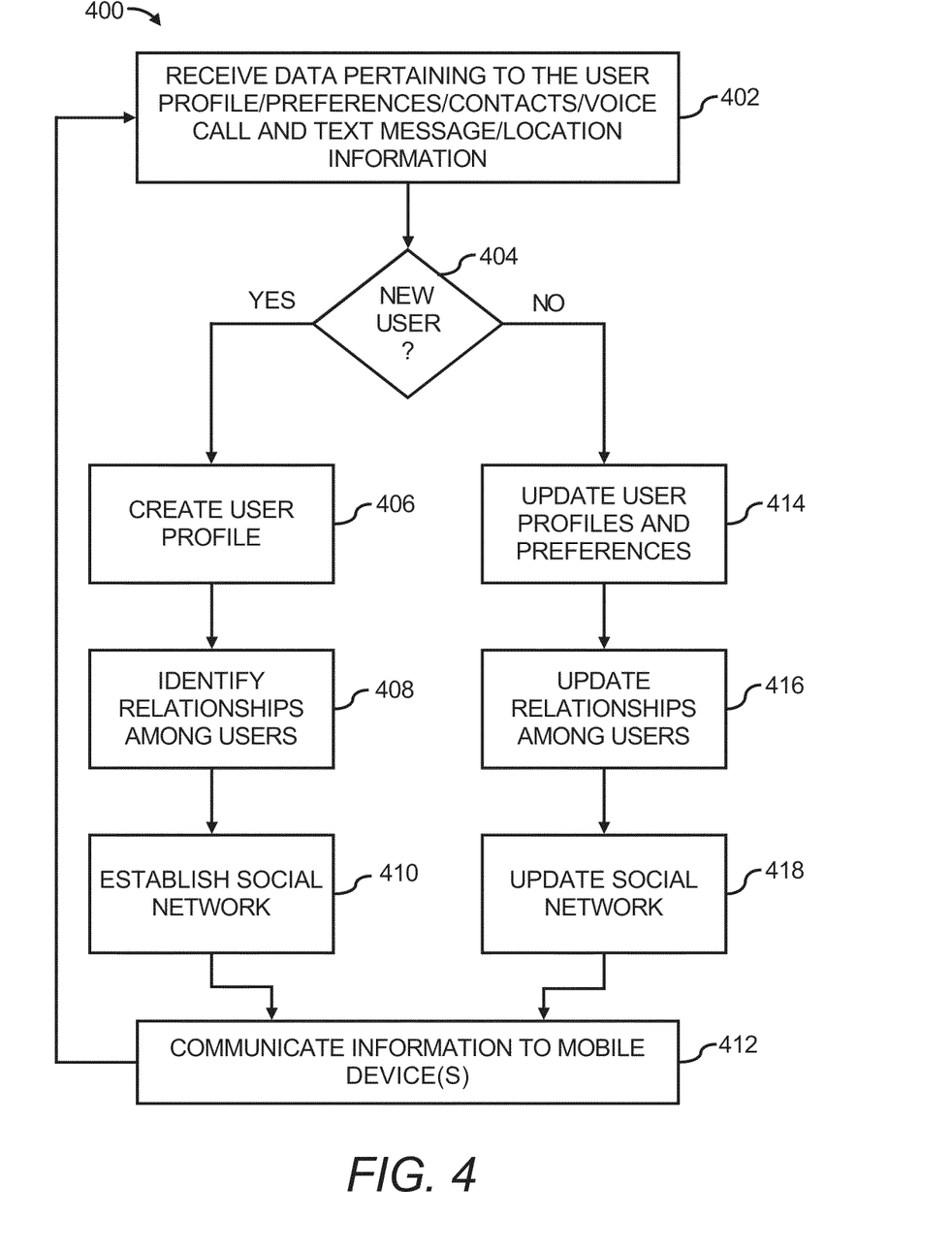
FIG. 4 illustrates a flow diagram of a method for establishing and operating a social network including a mobile device, according to an embodiment of the invention.
Figure 5:
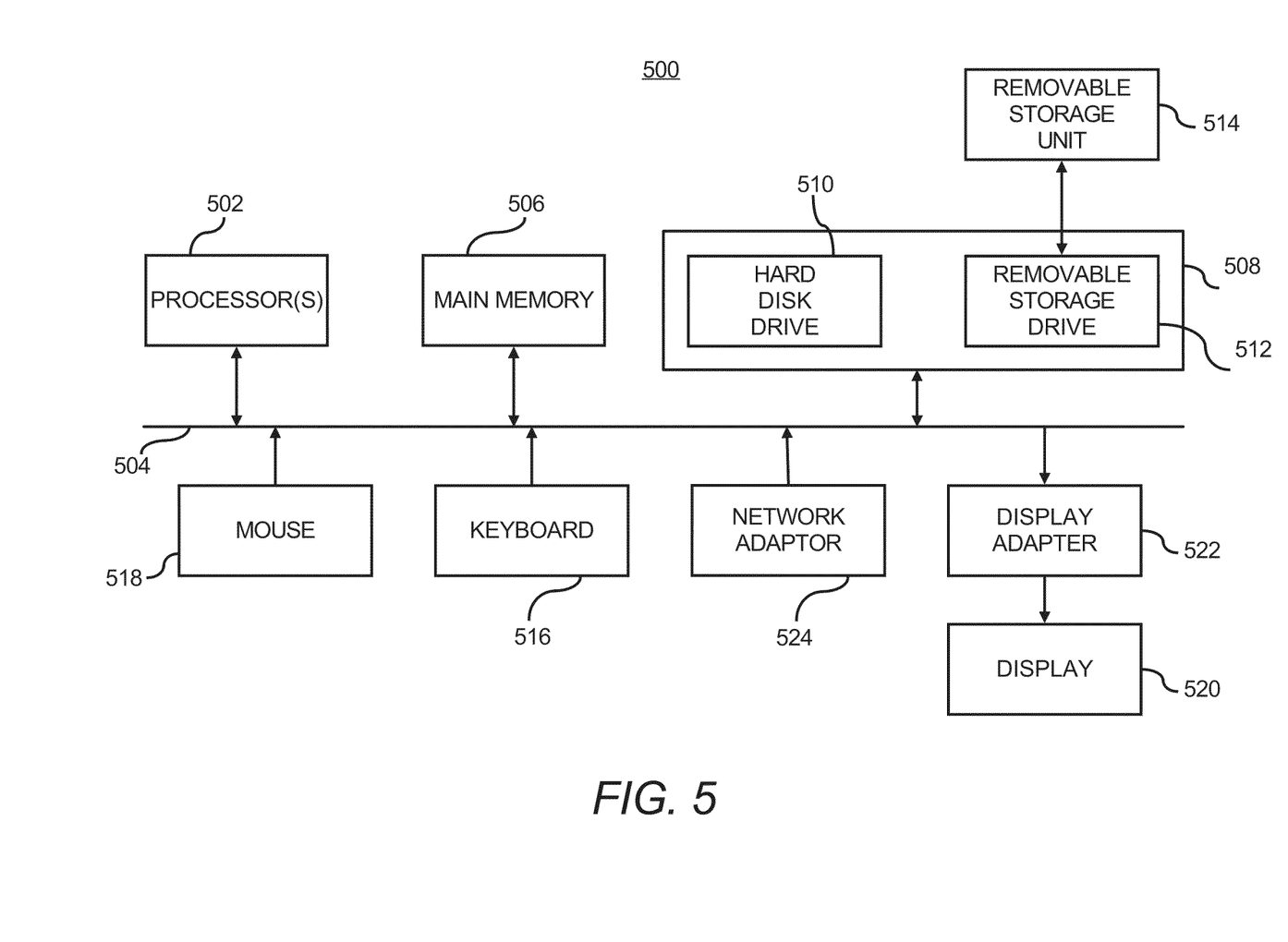
FIG. 5 illustrates a block diagram of a computing apparatus configured to implement or execute the methods depicted in FIGS. 3 and 4, according to an embodiment of the invention.

FIG. 5 illustrates a block diagram of a computing apparatus 500 configured to implement or execute either of the methods 300 and 400 depicted in FIGS. 3 and 4, according to an example. In this respect, the computing apparatus 500 may be used as a platform for executing one or more of the functions described hereinabove with respect to one or more of the mobile device 102 and the server 120 depicted in FIG. 2.

The computing apparatus 500 includes a processor 502 that may implement or execute some or all of the steps described in either of the methods 300 and 400. Commands and data from the processor 502 are communicated over a communication bus 504. The computing apparatus 500 also includes a main memory 506, such as a random access memory (RAM), where the program code for the processor 402, may be executed during runtime, and a secondary memory 508. The secondary memory 508 includes, for example, one or more hard disk drives 510 and/or a removable storage drive 512, representing a floppy diskette drive, a magnetic tape drive, a compact disk drive, etc., where a copy of the program code for one of the methods 300 and 400 may be stored.

The removable storage drive 512 reads from and/or writes to a removable storage unit 514 in a well-known manner. User input and output devices may include a keyboard 516, a mouse 518, and a display 520. A display adaptor 522 may interface with the communication bus 504 and the display 520 and may receive display data from the processor 502 and convert the display data into display commands for the display 520. In addition, the processor(s) 502 may communicate over a network, for instance, the Internet, LAN, etc., through a network adaptor 524.

It will be apparent to one of ordinary skill in the art that other known electronic components may be added or substituted in the computing apparatus 400. It should also be apparent that one or more of the components depicted in FIG. 5 may be optional (for instance, user input devices, secondary memory, etc.).

What has been described and illustrated herein is a preferred embodiment of the invention along with some of its variations. The terms, descriptions and figures used herein are set forth by way of illustration only and are not meant as limitations. Those skilled in the art will recognize that many variations are possible within the scope of the invention, which is intended to be defined by the following claims—and their equivalents—in which all terms are meant in their broadest reasonable sense unless otherwise indicated.

What is claimed is:

1. A non-transitory computer readable storage medium on which is embedded one or more computer programs for implementing a method for social networking of mobile devices based upon telephone numbers of the mobile devices, said one or more computer programs comprising a set of instructions for:

receiving user profile information and telephone numbers of contacts from a plurality of users' mobile devices;

identifying the plurality of users' mobile devices based upon their respective telephone numbers;

at least one of creating and updating respective user profiles based upon the telephone numbers of the users' mobile devices and the received profile information;

identifying relationships among the users based at least upon the contacts contained in contacts information of the plurality of users' mobile devices;

establishing a social network group including at least two of the users' mobile devices by grouping the plurality of users' mobile devices based upon the identified relationships among the users;

classifying the users into a plurality of categories in the social network group; and causing communication of data pertaining to at least one of calls and texts made through the first user's mobile device of the plurality of users' mobile devices to a second user's mobile device of the plurality of users' mobile devices dependent upon whether the second user belongs to a first category of the plurality of categories.

2. The non-transitory computer readable storage medium according to claim 1, said one or more computer programs further comprising a set of instructions for:

communicating information pertaining to the first user in the social network group to at least one other user's mobile device in the social network group, the information to include identification of contacts stored in the first user's mobile device arranged into various categories.

3. The non-transitory computer readable storage medium according to claim 1, said one or more computer programs further comprising a set of instructions for:

receiving log information, the log information comprising at least one of call log information and text log information from the users' mobile devices;

determining strengths of relationships between each of the users based upon the at least one of the call log information and the text log information;

classifying the users with respect to each other into the plurality of categories in the social network group based upon at least one of the determined strengths of the relationships between the plurality of users, explicit groups made by the user, and one or more characteristics of interactions between the user and the plurality of users;

arranging the contacts in a ranked order list according to the categories into which the contacts have been classified; and communicating different types of information to the users based upon the categories into which the users fall with respect to each other.

4. The non-transitory computer readable storage medium according to claim 3, said one or more computer programs further comprising a set of instructions for:

tracking the one or more characteristics of interactions of the at least one of calls and texts made through the first user's mobile device from the received at least one of call log information and text log information of the first user's mobile device; and communicating the tracked one or more characteristics of interactions and the tracked at least one of calls and texts made through the first user's mobile device to a second user's mobile device.

5. The non-transitory computer readable storage medium according to claim 1, said one or more computer programs further comprising a set of instructions for:

receiving a request from the first user to connect to the second user;

communicating the request to the second user's mobile device;

receiving an indication as to whether the second user accepted or denied the request; and connecting the first user to the second user in response to receipt of an indication that the second user accepted the request to connect to the first user.

6. The non-transitory computer readable storage medium according to claim 5, said one or more computer programs further comprising a set of instructions for:

determining whether a user profile of the second user has been created; and wherein communicating the request to the second user further comprises communicating the request to the second user in response to a determination that the user profile of the second user has been created.

7. The non-transitory computer readable storage medium according to claim 1, said one or more computer programs further comprising a set of instructions for:

receiving updated profile information from a user's mobile device; and communicating the updated profile information to mobile devices of the users in the social network group.

8. The non-transitory computer readable storage medium according to claim 1, said one or more computer programs further comprising a set of instructions for:

receiving preferences from the plurality of users, wherein the preferences define the information that is made available to mobile devices of the users in the social network group and to persons outside of the social network group.

9. The non-transitory computer readable storage medium according to claim 1, said one or more computer programs further comprising a set of instructions for:

receiving location information from the plurality of users' mobile devices;

tracking locations of plurality of users' mobile devices;

communicating the tracked locations of one or more of the plurality of users' mobile devices to mobile devices of the users in the social network group; and communicating an alert when the first user's mobile device is within a predetermined proximity the second user's mobile device.

10. The non-transitory computer readable storage medium according to claim 1, said one or more computer programs further comprising a set of instructions for:

ordering the contacts based upon a relative strength of the identified relationships with the contacts; and causing the contacts to be displayed based upon the relative strength of the identified relationships.

11. The non-transitory computer readable storage medium according to claim 3, said one or more computer programs further comprising a set of instructions for:

causing a private profile to display to users within the social network group; and causing a public profile to display to users outside the social network group.

12. A non-transitory computer readable storage medium comprising a set of program instructions that, when executed by a processor, cause the processor to:

receive user profile information and telephone numbers of contacts from a plurality of users' mobile devices;

identify the plurality of users' mobile devices based upon their respective telephone numbers;

at least one of create and update respective user profiles based upon the telephone numbers of the users' mobile devices and the received user profile information;

identify relationships among users of the plurality of users' mobile devices based at least upon contacts contained in the contacts information;

classify the users with respect to each other into a plurality of categories based upon at least one of strengths of the relationships between the plurality of users, groupings made by the user, and a characteristic of interactions between the user and the plurality of users;

order the contacts based upon the strengths of the identified relationships with the contacts;

establish a social network group including at least two of the users' mobile devices by grouping the plurality of users' mobile devices based upon the identified relationships among the users;

receive at least one of call log information and text log information from the users' mobile devices;

track at least one of calls and texts made through a first user's mobile device from the received at least one of call log information and text log information of the first user's mobile device; and communicate the tracked at least one of calls and texts made through the first user's mobile device to a second user's mobile device dependent upon whether the second user's mobile device belongs to a particular category in the social network group.

13. A non-transitory computer readable storage medium on which is embedded a set of instructions that, when executed by a processor, cause the processor to:

receive user profile information and telephone numbers of contacts from a plurality of users' mobile devices;

identify the plurality of users' mobile devices based upon their respective telephone numbers;

at least one of create and update respective user profiles based upon the telephone numbers of the users' mobile devices and the received profile information;

identify relationships among the users based at least upon contacts contained in contacts information of the plurality of users' mobile devices;

establish a social network group including at least two of the users' mobile devices by grouping the plurality of users' mobile devices based upon the identified relationships among the users;

arrange the contacts in a ranked order list according to categories into which the contacts are classifiable with respect to each other;

track data of the social network group based on the identified relationships, the data comprising log information of at least one of calls and texts made through a first user's mobile device of the plurality of users' mobile devices; and communicate the data to a second user's mobile device of the plurality of user's mobile devices dependent upon whether the second user's mobile device belongs to a particular category in the social network group.

14. The non-transitory computer readable storage medium according to claim 13, wherein the set of instructions to cause the processor to communicate the data causes the processor to:

communicate locations of one or more of the plurality of users' mobile devices of the users in the social network group; and communicate an alert when the first user's mobile device is within a predetermined proximity of the second user's mobile device.

15. The non-transitory computer readable storage medium according to claim 13, wherein the set of instructions cause the processor to:

receive the log information from the users' mobile devices;

determine strengths of relationships between each of the users based upon the log information;

classify the users with respect to each other into a plurality of categories based upon at least one of the strengths of the relationships between the plurality of users groupings made by the user, and a characteristic of interactions between the user and the plurality of users.

16. The non-transitory computer readable storage medium according to claim 13, wherein the set of instructions to cause the processor to:

cause the contact information, status information of the first user's mobile device, and the strengths of the relationships to display on the second user's mobile device.

* * * * *